United States Patent
Linden et al.

(10) Patent No.: US 10,737,560 B2
(45) Date of Patent: Aug. 11, 2020

(54) OPERATING MECHANISM FOR REAR HINGED FULLY SEALED INDEPENDENT SIDE OPERATING DOORS

(71) Applicant: Ford Global Technologies, LLC, Dearborn, MI (US)

(72) Inventors: Howard Paul Tsvi Linden, Southfield, MI (US); Ronald Patrick Brombach, Plymouth, MI (US); Kosta Papanikolaou, Huntington Woods, MI (US); Christopher Matthew Radjewski, Macomb Township, MI (US); Henry W. Hausler, Manchester, MI (US); John Thomas Ricks, Taylor, MI (US); George Anthony Bernwanger, Jr., Northville, MI (US); Donald P. Iacovoni, Plymouth, MI (US); Paul L. Heirtzler, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/446,959

(22) Filed: Jun. 20, 2019

(65) Prior Publication Data
US 2019/0299758 A1 Oct. 3, 2019

Related U.S. Application Data

(62) Division of application No. 15/241,115, filed on Aug. 19, 2016, now Pat. No. 10,369,870.

(51) Int. Cl.
*B60J 5/04* (2006.01)
*E05B 83/38* (2014.01)
*E05F 17/00* (2006.01)
*E05D 3/12* (2006.01)
*E05F 15/614* (2015.01)
*E05B 83/04* (2014.01)

(52) U.S. Cl.
CPC .......... *B60J 5/0477* (2013.01); *B60J 5/0479* (2013.01); *E05B 83/38* (2013.01); *E05D 3/127* (2013.01); *E05F 15/614* (2015.01); *E05F 17/004* (2013.01); *E05B 83/04* (2013.01); *E05Y 2201/22* (2013.01); *E05Y 2900/531* (2013.01)

(58) Field of Classification Search
CPC .................................. E05B 83/38; E05B 83/40
USPC ..................................... 296/146.11
See application file for complete search history.

(56) References Cited

U.S. PATENT DOCUMENTS

| 6,382,705 B1 | 5/2002 | Lang et al. |
| 6,386,621 B1 | 5/2002 | Kozak et al. |

(Continued)

FOREIGN PATENT DOCUMENTS

| CA | 2536180 | 12/2013 |
| DE | 102011010716 | 8/2012 |

(Continued)

*Primary Examiner* — Hilary L Gutman
(74) *Attorney, Agent, or Firm* — David Coppiellie; Price Heneveld LLP (57) ABSTRACT

A vehicle door includes a door panel slidably operable between a secured position within a door aperture and a staging position partially distal from the door aperture. A latch is engaged with a striker path during operation of the door panel between the secured and staging positions, and is selectively disengaged from the striker path to define open and closed positions of the door panel when the door panel is in the staging position.

8 Claims, 6 Drawing Sheets

(56) References Cited

U.S. PATENT DOCUMENTS

| | | |
|---|---|---|
| 7,320,495 B2 | 1/2008 | Menke |
| 7,416,320 B2 | 8/2008 | Sakiyama et al. |
| 7,488,029 B2 | 2/2009 | Lechkun et al. |
| 7,748,770 B2 | 7/2010 | Heuel et al. |
| 8,297,689 B2 | 10/2012 | Konchan et al. |
| 8,870,263 B2 | 10/2014 | Choi |
| 9,073,413 B2 | 7/2015 | Maruyama et al. |
| 9,849,759 B2 | 12/2017 | Lovelace et al. |
| 2003/0107237 A1 | 6/2003 | Brodt et al. |

FOREIGN PATENT DOCUMENTS

| | | |
|---|---|---|
| JP | 4590691 | 12/2010 |
| JP | 5491158 | 5/2014 |

OPERATING MECHANISM FOR REAR HINGED FULLY SEALED INDEPENDENT SIDE OPERATING DOORS

CROSS-REFERENCE TO RELATED APPLICATION

The present application is a divisional of U.S. patent application Ser. No. 15/241,115 filed Aug. 19, 2016, entitled OPERATING MECHANISM FOR REAR HINGED FULLY SEALED INDEPENDENT SIDE OPERATING DOORS, the entire disclosure of which is hereby incorporated herein by reference.

FIELD OF THE INVENTION

The present invention generally relates to vehicle doors, and more specifically, a rear-hinged fully sealed side door that operates in a mullion-free setting with a front-hinged side opening door.

BACKGROUND OF THE INVENTION

Within various vehicles, a front-hinged side door may be paired with a smaller rear-hinged door that has no exterior door handle on the outer surface of the rear-hinged door. Typically, to operate such rear-hinged doors, the front door must first be opened to reveal a door handle for the rear-hinged door located on an edge panel of the rear-hinged door.

SUMMARY OF THE INVENTION

According to one aspect of the present invention, a vehicle includes a passenger cabin having an access aperture with oppositely hinged forward and rearward doors coupled to a vehicle frame and a rearward hinge assembly having a first hinge extending between the vehicle frame and the rearward door and a second hinge positioned at an end of the first hinge proximate the rearward door. Operation of the first hinge slides the rearward door between a secured position and a staging position. The secured position is defined by a portion of the rearward door being positioned within the aperture and between the vehicle frame and the forward door. The staging position is defined by the rearward door translating in a rearward and outward direction away from the aperture and the forward door. Operation of the second hinge rotates the rearward door between open and closed positions when the rearward door is in the staging position. A latch of the rearward door translates along a striker path during operation of the first hinge. The latch remains selectively secured within the striker path during operation of the rearward door from the secured and staging positions. The latch is selectively engaged and disengaged from the striker path when the rearward door is in the staging position.

According to another aspect of the present invention, a vehicle door includes a door panel slidably operable between a secured position within a door aperture and a staging position partially distal from the door aperture. A latch is engaged with a striker path during operation of the door panel between the secured and staging positions, and is selectively disengaged from the striker path to define open and closed positions of the door panel when the door panel is in the staging position.

According to another aspect of the present invention, a vehicle door includes a motor that guides a door latch along a linear striker path of a vehicle frame and simultaneously rotates a door about the door latch when engaged within the striker path to define secured and staging positions of the door. Also included is a hinge around which the door rotates when the door is in the staging position, the hinge and latch being positioned on different edges of the door.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
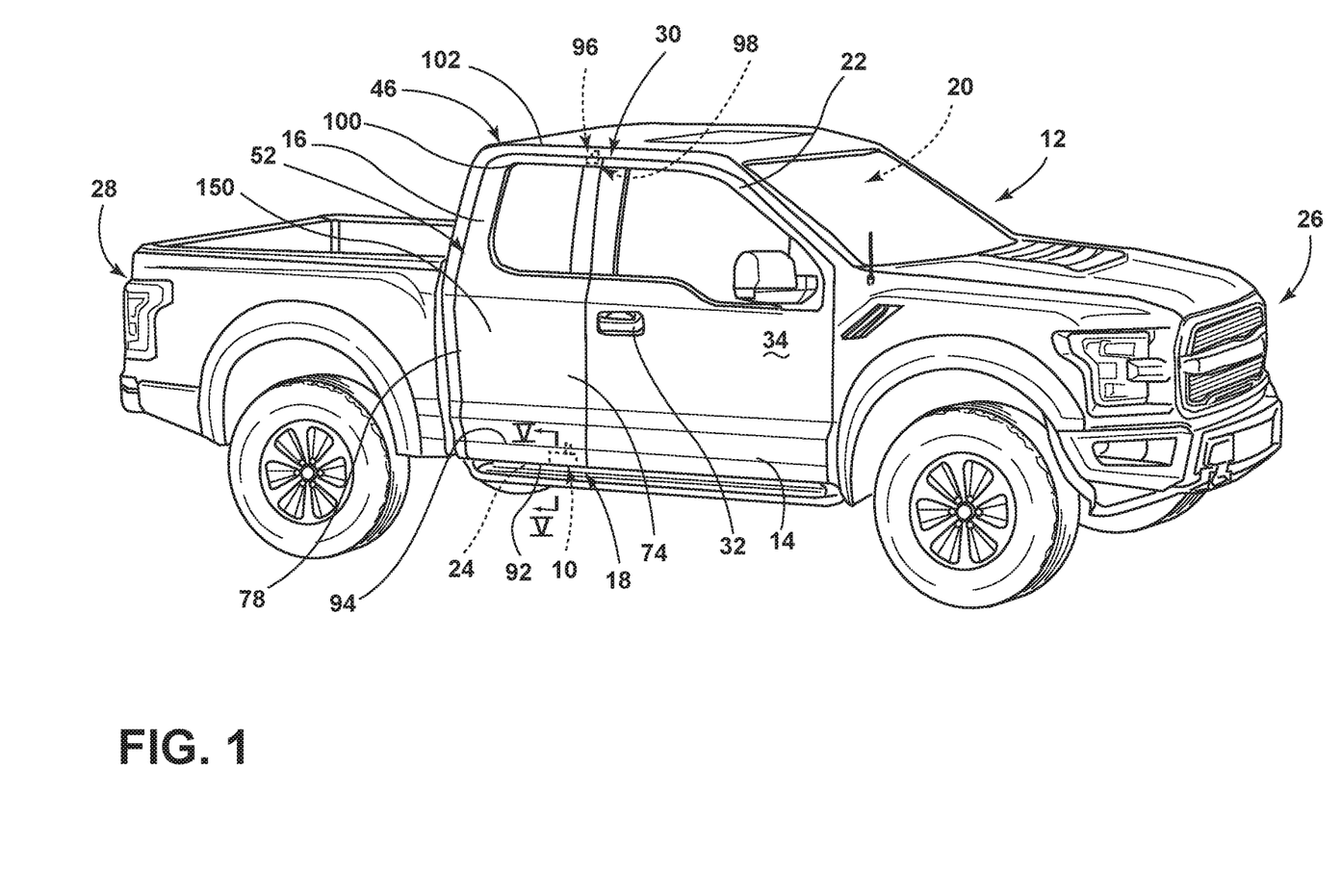
FIG. 1 is a side perspective view of a vehicle incorporating an aspect of the latch sliding mechanism.
Figure 2:
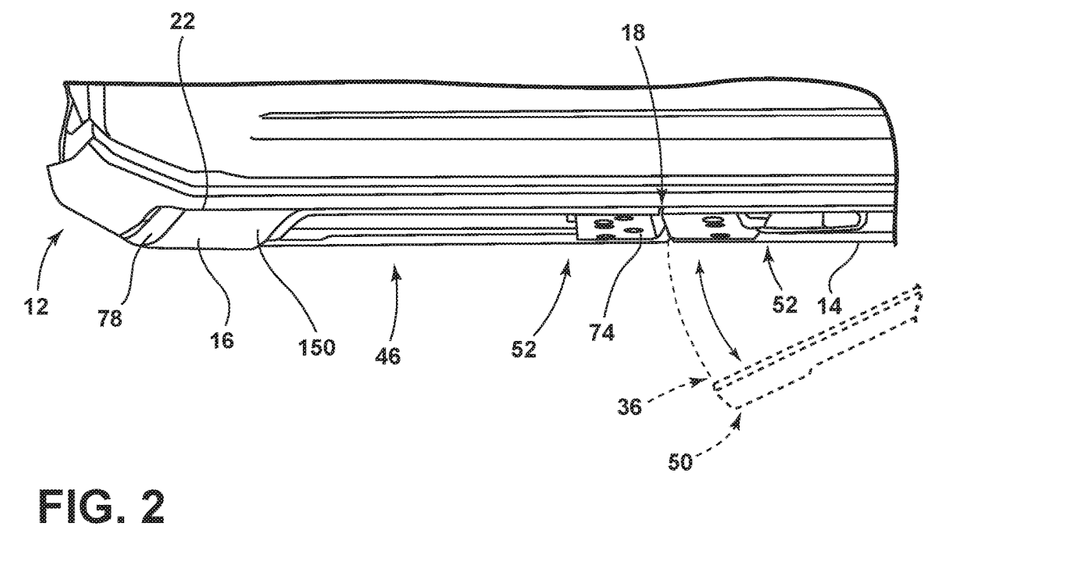
FIG. 2 is a partial top plan view of the vehicle of FIG. 1 showing the forward door and rearward door each in closed and secured positions.
Figure 3:
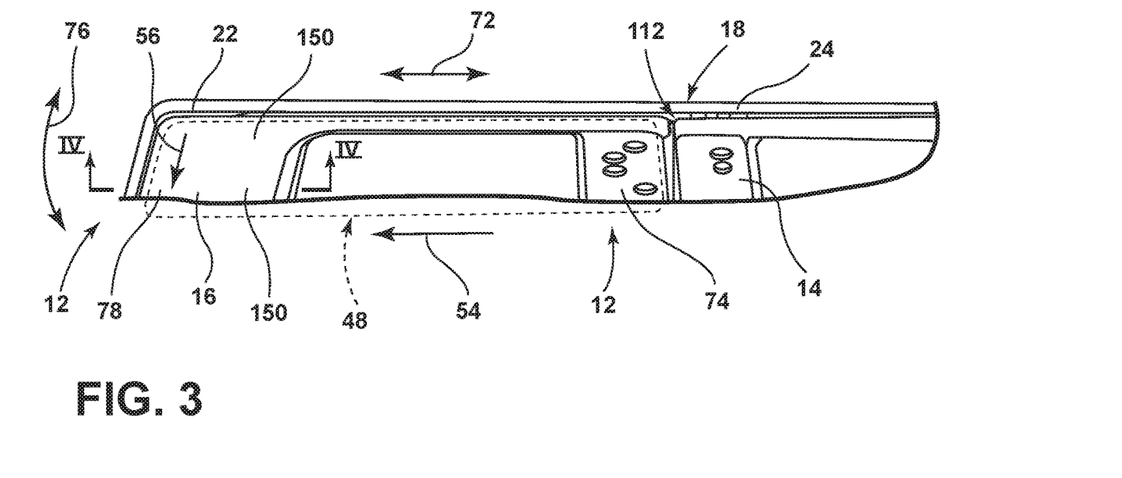
FIG. 3 is a partial top plan view of the vehicle of FIG. 2 showing the rearward door moving toward the staging position.
Figure 4:
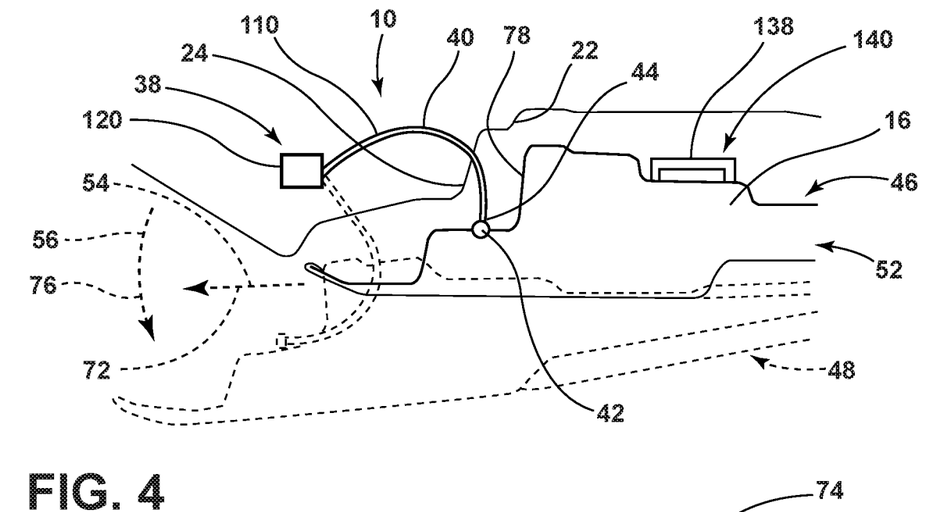
FIG. 4 is a schematic cross-sectional view of the vehicle door of FIG. 3 showing operation of the hinge assembly from the secured position to the staging position.
Figure 5:
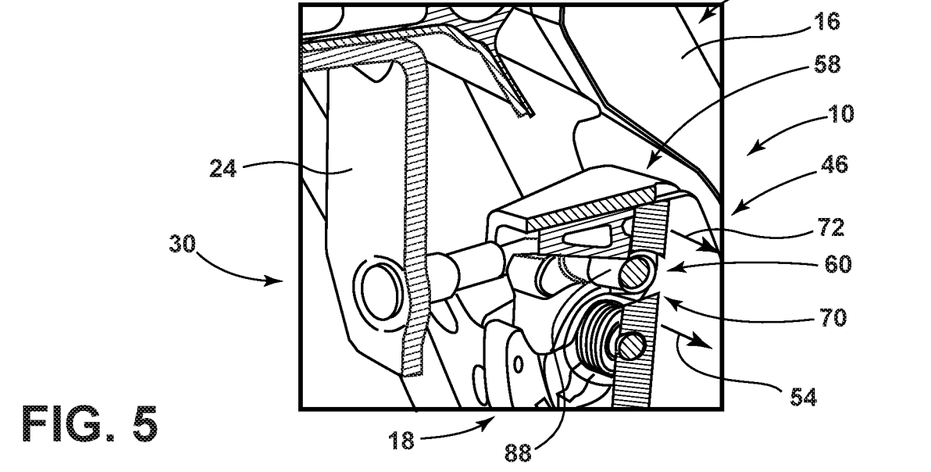
FIG. 5 is a bottom perspective cross-sectional view of the vehicle door of FIG. 1 taken through the elongated striker of the latch-sliding mechanism, indicated at line V-V.
Figure 6:
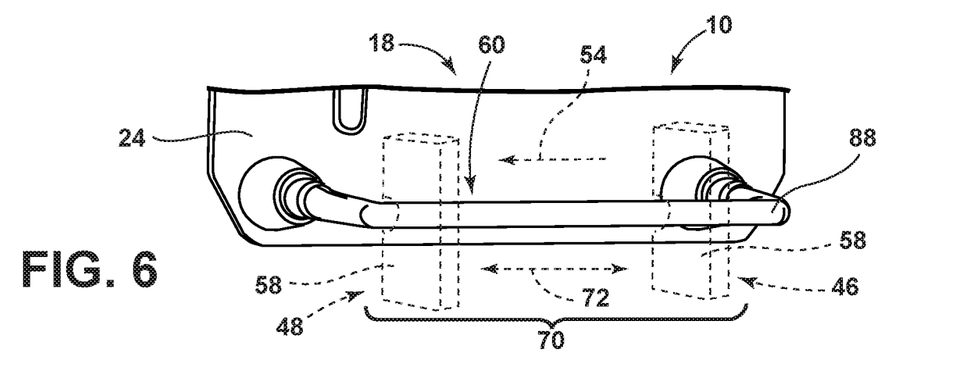
FIG. 6 is a perspective view of the elongated striker and illustrating operation of the latch of the latch sliding mechanism between the secured and staging positions.
Figure 7:
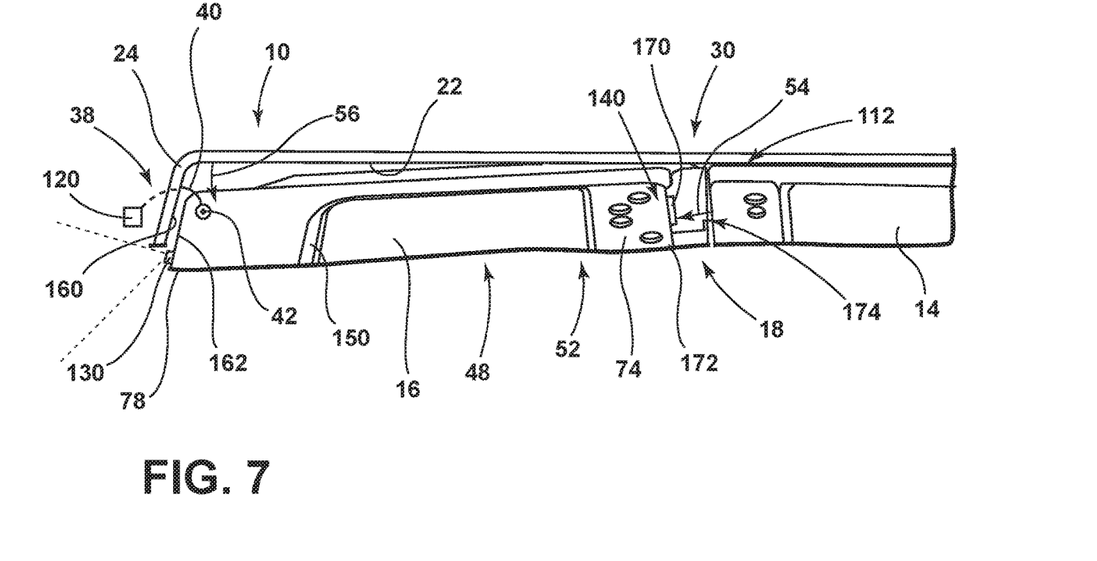
FIG. 7 is a partial top plan view of the vehicle door of FIG. 3 with the door in the staging position.
Figure 8:
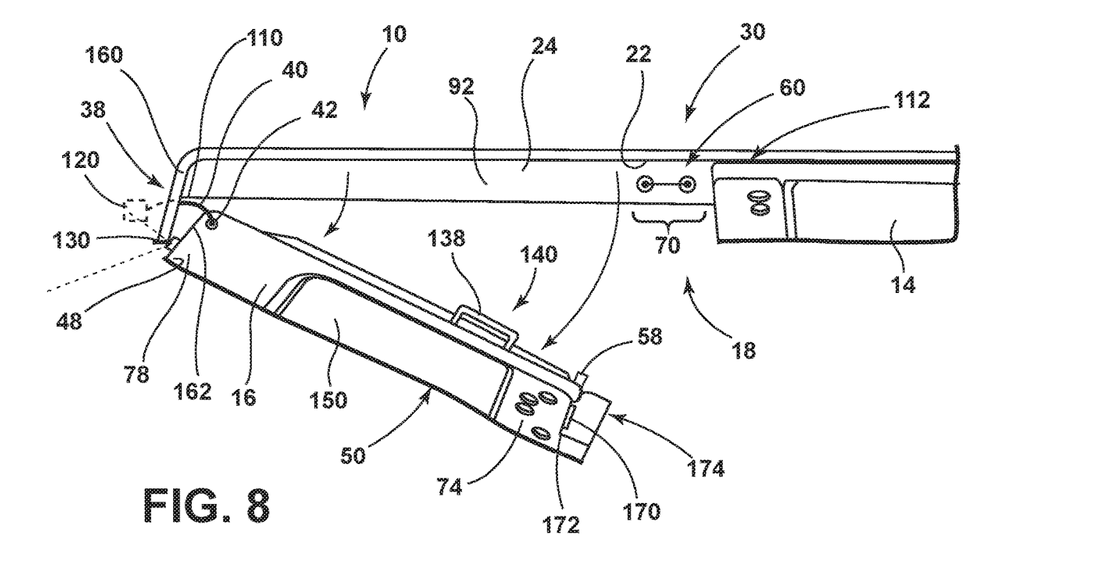
FIG. 8 is a partial top plan view of the vehicle door of FIG. 7 showing the rear hinged door in the staging position and operating between the open and closed positions.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-8, reference numeral 10 generally refers to a latch sliding mechanism incorporated within a vehicle 12 having a front-hinged forward door 14 and a rear-hinged rearward door 16 that meet at a mullion-free securing location 18 and are operable to provide access into and from a passenger cabin 20 of the vehicle 12. The vehicle 12 can include a passenger cabin 20 having an access aperture 22 with oppositely hinged forward and rearward doors 14, 16 that are coupled to a frame 24 of the vehicle 12. The forward door 14 can be a front-hinged door that opens toward a front 26 of the vehicle 12. The rearward door 16 can be a rear-hinged door that opens toward a rear 28 of the vehicle 12, where the forward and rearward doors 14, 16 meet at a central portion 30 of the access aperture 22. The forward and rearward doors 14, 16 are adapted to meet at a location that typically includes a "B" pillar. However, in the various embodiments disclosed herein, the vehicle 12 does not include the "B" pillar. Accordingly, the access aperture 22 is a single continuous opening that serves both the forward and rearward doors 14, 16. The forward door 14 can include a conventional hinge mechanism where a door handle 32 is positioned on an exterior surface 34 of the forward door 14 for operating the forward door 14 between a plurality of forward-door positions 36. For operating the rearward door 16, a rearward hinge assembly 38 can include a first hinge 40 that extends between the frame 24 of the vehicle 12 and the rearward door 16. A second hinge 42 can be positioned at an end 44 of the first hinge 40 proximate the rearward door 16. Operation of the first hinge 40 serves to translate the rearward door 16 between a secured position 46 and a staging position 48. The secured position 46 is defined by a portion of the rearward door 16 being positioned within the access aperture 22 and secured or tucked between a portion of the frame 24 of the vehicle 12 and a portion of the forward door 14. In the secured position 46, and when the forward door 14 is closed, the rearward door 16 is incapable of being operated between the open and closed positions 50, 52. The staging position 48 of the rearward door 16 is defined by the rearward door 16 translating in a rearward direction 54 and outward direction 56 away from the access aperture 22 and away from the forward door 14. Once in the staging position 48, operation of the second hinge 42 rotates the rearward door 16 between open and closed positions 50, 52. A latch 58 of the rearward door 16 is adapted to translate along a striker path 60 during operation of the first hinge 40. During operation of the first hinge 40 between the secured and staging positions 46, 48, the latch 58 remains selectively secured within the striker path 60. The latch 58 can be selectively engaged and disengaged from the striker path 60 when a rearward door 16 is in the staging position 48.

As the rearward door 16 moves between the secured and staging positions 46, 48, the rearward door 16 is adapted to rotate about a point within an engagement area 70 defined by the selective engagement of the latch 58 with the striker path 60. In this manner, the striker path 60 is defined by a linear motion 72, or substantially linear motion 72, of a latch side 74 of the door in combination with a rotating motion 76 of the rearward door 16 at a hinge side 78 of the rearward door 16. This combination of linear and rotating motion 76 of the rearward door 16 accomplishes the simultaneous motion of the rearward door 16 in the rearward and outward directions 54, 56 to define the secured and staging positions 46, 48. As the rearward door 16 translates along the striker path 60, the rotational point that the rearward door 16 rotates also translates along the striker path 60. This rotational point follows the engagement of the latch 58 with the striker path 60.

Referring again to FIGS. 4-7, it is contemplated that the striker path 60 along which the latch 58 operates during operation of the rearward door 16 between the secured and staging positions 46, 48 can be defined by an elongated striker 88 that is coupled to the frame 24 of the vehicle 12.

During operation of the rearward door 16 between the secured and staging positions 46, 48, the latch 58, engaged within the striker path 60, slides along the elongated striker 88 between the secured and staging positions 46, 48. As discussed previously, as the latch 58 slides along the elongated striker 88, the rearward door 16 rotates about a point within the engagement area 70 defined by the engagement between the latch 58 and the elongated striker 88.

Referring again to FIGS. 1-8, the latch sliding mechanism 10 incorporated within the rearward door 16 provides for a configuration of the forward and rearward doors 14, 16 that is free of a central mullion or "B" pillar, extending through a central portion 30 of the access aperture 22. It is contemplated that the striker path 60, such as the elongated striker 88, or the operable striker 90 (exemplified in FIGS. 9 and 10), which will be discussed more fully below, can be disposed within a bottom portion 92 of the access aperture 22 attached to or defined within a portion of the frame 24 of the vehicle 12. Accordingly, the latch 58 of the rearward door 16 can be positioned within a lower portion 94 of the rearward door 16 proximate the latch side 74 of the rearward door 16.

In various embodiments, to further secure the rearward door 16 within the secured and staging positions 46, 48, the rearward door 16 can include an upper latch or secondary latch 96 that engages a secondary striker 98 disposed at an upper portion 100 of the access aperture 22 proximate a roof line 102 of the frame 24 of the vehicle 12. It is contemplated that the secondary latch 96 would simply follow the operation of the latch 58 disposed at a lower portion 94 of the rearward door 16. It is also contemplated that this secondary latch 96 may only serve to secure the rearward door 16 in the secured position 46. In such an embodiment, when the rearward door 16 is moved from the secured to the staging positions 46, 48, the secondary latch 96 may release from the secondary striker 98, such that when the rearward door 16 is in the staging position 48, the rearward door 16 is only secured to the frame 24 of the vehicle 12 through the engagement of the latch 58 within the striker path 60 at the bottom portion 92 of the access aperture 22. It is contemplated that the positions of the latch 58 and the striker path 60 can be switched to be proximate the roof line 102 of the vehicle 12.

Referring again to FIGS. 1-8, it is contemplated that the rearward door 16 can only be operated between the open and closed positions 50, 52 when the rearward door 16 is in the staging position 48. Alternatively, it is contemplated that the rearward door 16 can be operated between the open and closed positions 50, 52 from the secured position 46, when the forward door 14 is moved to the open position 50. In such an embodiment, if the forward door 14 is moved to a closed position 52 before the rearward door 16 is moved to a closed position 52, closure of the forward door 14 can result in the latch sliding mechanism 10 moving to the staging position 48 without being engaged with the rearward door 16. Accordingly, when the rearward door 16 is moved to the closed position 52, engagement of the latch 58 of the rearward door 16 will be within the staging position 48 of the striker path 60 to avoid a collision with the closed forward door 14. Once in the staging position 48, the rearward door 16 can then be translated forward and inward within the access aperture 22 to define the secured position 46 of the rearward door 16. Typically, the rearward door 16 will move from a secured position 46 to the staging position 48, each time that the occupant desires to open the rearward door 16, regardless of the position of the forward door 14.

Referring again to FIGS. 4, 7 and 8, it is contemplated that the rearward hinge assembly 38 having the first and second hinges 40, 42 can include a first hinge 40 in the form of a gooseneck hinge 110 that serves to move the hinge side 78 of the rearward door 16 in a combined outward and rearward direction 56, 54. This operation of the gooseneck hinge 110 serves to pull the latch side 74 of the rearward door 16 out of the tuck space 112 defined between the forward door 14 and the frame 24 of the vehicle 12. Accordingly, the staging position 48 places the rearward door 16 in a condition such that it can freely operate between the open and closed positions 50, 52.

Referring again to FIGS. 4-10, in order to assist the user in operating the rearward door 16 between the secured and staging positions 46, 48, the rearward door 16 can include a motor 120 that is coupled to at least one of the rearward hinge assembly 38 and the striker path 60, or both of these assemblies. It is contemplated that operation of the motor 120 serves to manipulate the rearward door 16 between the secured and staging positions 46, 48. Where a motor 120 is disposed at the rearward hinge assembly 38, the motor 120 serves to rotate the gooseneck hinge 110 to manipulate the rearward door 16 outward and rearward between the secured and staging positions 46, 48. The motor 120 can then operate again to manipulate the rearward door 16 between the staging position 48 and secured position 46 through operation of the gooseneck hinge 110.

Figure 9:
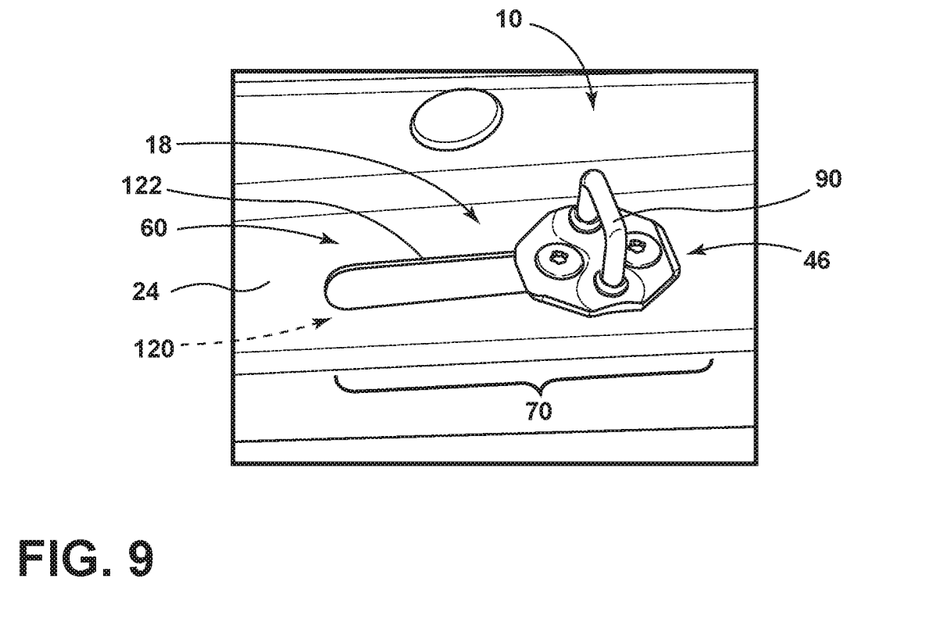
FIG. 9 is a perspective view of an alternate aspect of the striker path and illustrating an operable striker in the secured position.
Figure 10:
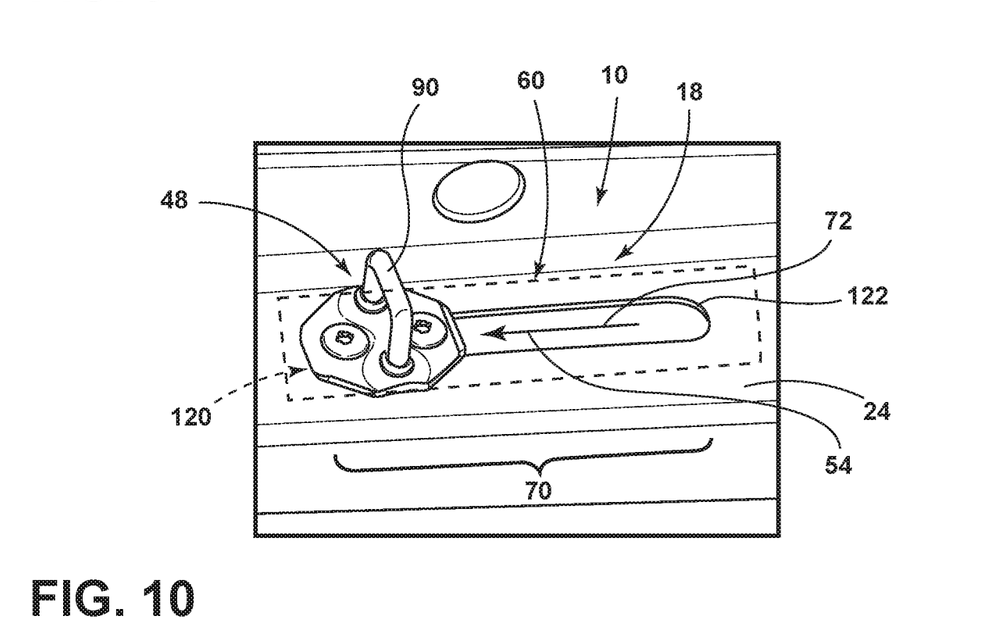
FIG. 10 is a perspective view of the operable striker of FIG. 9 showing the operable striker in the staging position.
Figure 11:
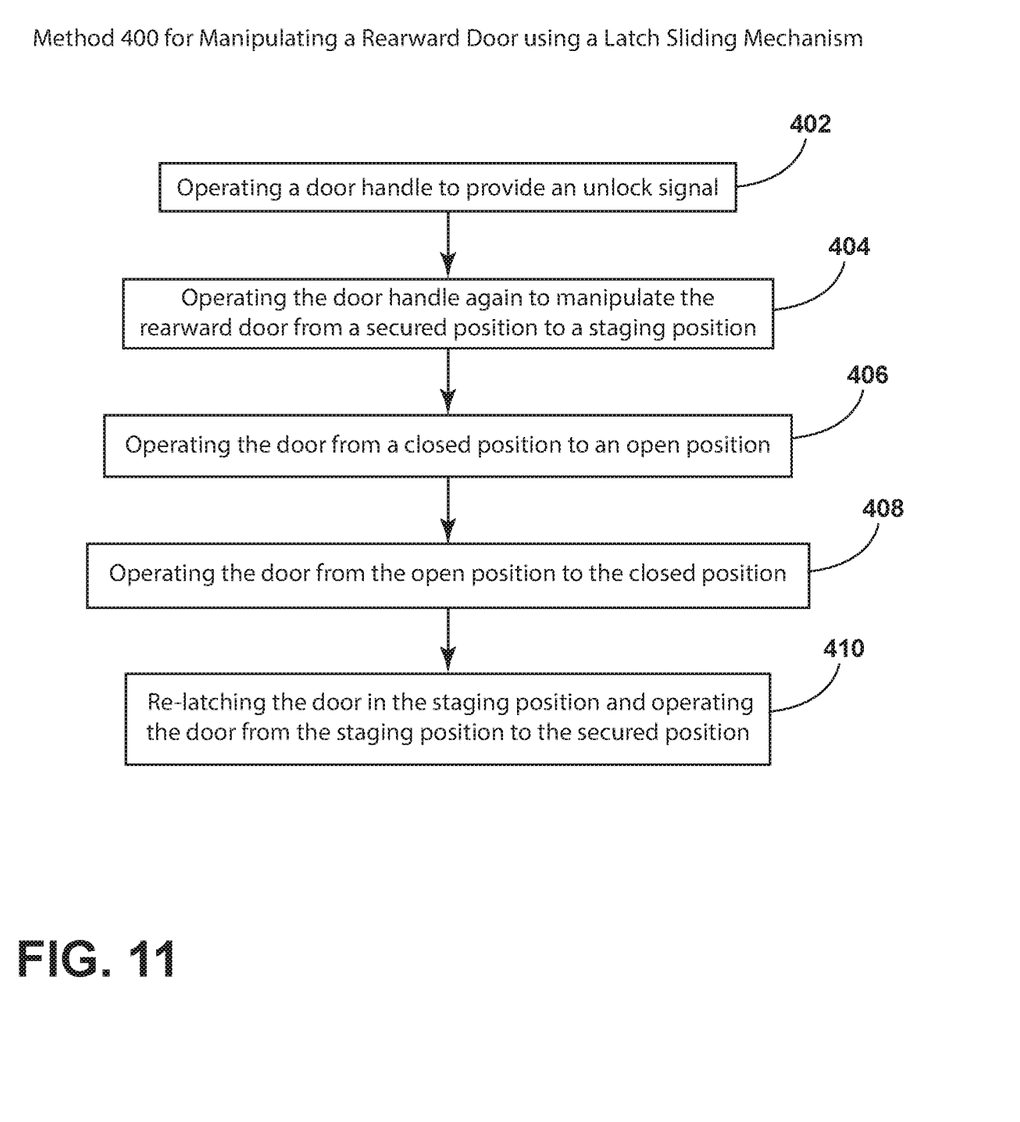
FIG. 11 is a linear flow diagram illustrating operation of a rear hinged door having a latch sliding mechanism.

As exemplified in FIGS. 9 and 10, it is also contemplated that a motor 120 can be positioned proximate the striker path 60 that translates the latch 58 through operation of the motor 120 within the striker path 60. Typically, a motor 120 located within the striker path 60 will operate an operable striker 90 that is slidably operable through a slot 122 that defines the striker path 60. The latch sliding mechanism 10 can include a single motor 120, where the single motor 120 is disposed within the rearward hinge assembly 38 or disposed proximate the striker path 60 for operating the operable striker 90. Alternatively, the latch sliding mechanism 10 can include two motors 120 at each of the rearward hinge assembly 38 and the striker path 60, where each of the plurality of motors 120 can be sized to be smaller and work in cooperation with one another. It is also contemplated that one of the motors 120, such as the motor 120 at the rearward hinge assembly 38, can be used to manipulate the rearward door 16 between the secured and staging positions 46, 48. The other motor 120, at the striker path 60, can be used to manipulate the rearward door 16 between the staging and secured positions 48, 46, or vice versa. It is contemplated that various other configurations of the motors 120 for operating the latch sliding mechanism 10 can be implemented.

Referring again to FIGS. 4-8, the rearward door 16 can include a lighting mechanism 130 that activates as the rearward door 16 moves between the secured and staging positions 46, 48 and/or as the rearward door 16 operates between the open and closed positions 50, 52. This lighting mechanism 130 of the rearward door 16 can serve to alert bystanders that the rearward door 16 will be opening outward and toward the rear 28 of the vehicle 12. In various embodiments, the lighting mechanism 130 can be accompanied by an auditory internal and/or external signal to alert the occupants and bystanders of the operation of the rearward door 16 between the secured and staging positions 46, 48 and/or the open and closed positions 50, 52. Because the occurrence of a rearward door 16 is not typically seen within most vehicles 12, the operation of a rearward door 16 may be an unexpected occurrence to various bystanders. The inclusion of the lighting mechanism 130 and/or an auditory signal can alert bystanders to the operation of the rearward door 16. The lighting mechanism 130 can be a single light or a plurality of lights positioned along a portion of the vehicle 12 and/or the rearward door 16.

Referring again to FIGS. 1-8, it is contemplated that the rearward door 16 can operate through an interior door handle 138 that includes a multi-operational release mechanism 140. The multi-operational release mechanism 140 can include an operating system that is defined by a series of manipulations of handle 138 that can serve to unlock the rearward door 16, move the rearward door 16 between the secured and staging positions 46, 48 and/or open the rear door, when in the staging position 48, from the closed position 52 to the open position 50 of the rearward door 16. It is also contemplated that a first manipulation of the multi-operational door handle 138 can serve to unlock the rearward door 16, and a second manipulation of the handle 138 of the rearward door 16 can initiate motion of the rearward door 16 from the secured position 46 to the staging positions 48. Once the rearward door 16 is in the staging position 48, the latch 58 can be adapted to automatically disengage from the striker path 60. The rearward door 16 can then either automatically rotate from the closed to the open position 52, 50, or can be pushed by the occupant from the closed position 52 to the open position 50. Similar operation in the opposing direction can be used as well for moving the rearward door 16 from the open position 50 to the closed position 52 to define the staging position 48. From the staging position 48, the latch sliding mechanism 10 can be used to move the rearward door 16 from the staging position 48 to the secured position 46.

It is contemplated that the multi-operational release mechanism 140 can be used in conjunction with a master control mechanism of the vehicle 12 to allow for operation of the rearward door 16 only in certain operational conditions of the vehicle 12. By way of example, and not limitation, where the vehicle 12 is moving in excess of a predetermined speed, such as approximately 3 km/hr, or the vehicle 12 is in a certain transmission setting (neutral, reverse, or one of the drive gears), the multi-operational release mechanism 140 may be substantially ineffective at operating the rearward door 16. It is also contemplated that when the appropriate parameters are met, i.e., the vehicle 12 moves below a certain speed or the transmission of the vehicle 12 is placed in "park," then the master control of the vehicle 12 can communicate to the latch sliding mechanism 10 an unlock signal or other operation signal that will allow the user to unlock the rearward door 16 and/or allow the occupant to manipulate the rearward door 16 between at least the secured and staging positions 46, 48.

Referring now to FIGS. 7-10, it is contemplated that the striker path 60 along which the latch 58 operates between the secured and staging positions 46, 48 can be defined by an operable striker 90 that is operably secured to the frame 24 of the vehicle 12. The operable striker 90 can be adapted to linearly translate through a slot 122 defined within the frame 24 of the vehicle 12 where the operable striker 90 moves along the slot 122 to define the secured and staging positions 46, 48. As with the other embodiments of the striker path 60, as the rearward door 16 moves between the secured and staging positions 46, 48, the rearward door 16 can at least partially rotate about an engagement area 70 between the latch 58 and the operable striker 90. This rotation of the rearward door 16 can be caused by the first hinge 40, typically in the form of a gooseneck hinge 110 that operates in conjunction with a hinge side 78 of the rearward door 16. As discussed above, the rearward door 16 can include a secondary striker path 60 and secondary latch 96. It is contemplated that, in certain embodiments, where an operable striker 90 is used, both the operable striker 90 and secondary striker 98 can include the operable striker 90 that move in unison between the secured position 46 and the staging position 48.

Referring again to FIGS. 1-10, the rearward door 16 of the vehicle 12 can include a door panel 150 that is slidably operable between the secured position 46 within the door access aperture 22 and a staging position 48 that is partially distal from the door access aperture 22 and the forward door 14. The latch 58 of the rearward door 16 can be engaged with a striker path 60 during operation of the door panel 150 between the secured and staging positions 46, 48. The door panel 150 can be selectively disengaged in the striker path 60 to define open and closed positions 50, 52 of the door panel 150 when the door panel 150 is in the staging position 48. In such an embodiment, it is contemplated that the striker path 60 can be positioned along a bottom portion 92 of the door access aperture 22 proximate the central portion 30 of the door access aperture 22. The door panel 150 can include a first hinge 40 that extends between the side edge 160 of the door aperture and a vertical edge 162 of the door panel 150 proximate a hinge side 78 of the door panel 150. It is contemplated that operation of the first hinge 40 at least partially guides the door panel 150 between the secured and staging positions 46, 48 and moves the door panel 150 in a combined and simultaneous linear and rotating motion 72, 76 relative to the door access aperture 22. The door panel 150 can also include the second hinge 42 that is positioned at the end 44 of the first hinge 40 at the vertical edge 162 of the hinge side 78 of the door panel 150. The second hinge 42 is adapted to at least partially guide operation of the door panel 150 between the open and closed positions 50, 52 when the first hinge 40 defines the staging position 48. As discussed above, the latch 58 can be positioned on a latch side 74 of the rearward door 16 and typically along a bottom surface of the rearward door 16 proximate the latch side 74. Similarly, the secondary latch 96 can be positioned proximate the latch side 74 of the rearward door 16 at a top portion of the rearward door 16.

Referring again to FIGS. 1-10, the rearward door 16 of the vehicle 12 can include a motor 120 that guides a latch 58 of the rearward door 16 along a linear strike path of the frame 24 of the vehicle 12. The motor 120 is adapted to simultaneously rotate the rearward door 16 about the latch 58 of the rearward door 16 when engaged with the striker path 60. In this manner, the motor 120 operates the rearward door 16 to define the secured and staging positions 46, 48 of the rearward door 16. The rearward door 16 of the vehicle 12 can also include a hinge, such as the rearward hinge assembly 38, around which the rearward door 16 rotates when the rearward door 16 is in the staging position 48. It is contemplated that the hinge and the latch 58 can be positioned along different edges or sides of the rearward door 16. As discussed above, the hinge can be disposed on a hinge side 78 of the rearward door 16 and the latch 58 can be disposed on a latch side 74 of the rearward door 16. As discussed above, the latch side 74 of the rearward door 16 can be proximate the forward door 14 and the hinge side 78 of the rearward door 16 can be opposite the forward door 14.

Referring now to FIGS. 1-11, having described the various embodiments of the latch sliding mechanism 10, a method 400 is disclosed for manipulating a rearward door 16 through the use of the latch sliding mechanism 10. According to the method 400, an unlock signal is provided to the rearward door 16 and the latch sliding mechanism 10 to unlock the rearward door 16, if locked (step 402). The unlock signal can be provided by a remote wireless signal from a key fob, smart phone, wearable technology, or other portable computing device able to transfer the unlock signal to the rearward door 16. Additionally, the unlock signal can be provided by operating the interior door handle 138 of the rearward door 16. It is contemplated that a single manipulation of the interior door handle 138 may be sufficient to provide the unlock signal and also operate the rearward door 16 between the secured position 46, the staging position 48 and the open position 50. It is also contemplated that a series of manipulations of the interior door handle 138 may be used to unlock and operate the rearward door 16. Once unlocked, the user can operate the door handle 138 or other portion of the rearward door 16 to activate a motor 120 for manipulating the rearward door 16 from the secured position 46 to the staging position 48 (step 404). As discussed above, as the rearward door 16 moves from the secured to the staging position 48, the rearward door 16 operates in a combined and substantially simultaneous linear and rotational manner to move the rearward door 16 rearward and outward from the access aperture 22 of the vehicle 12. In this manner, a latch side 74 of the rearward door 16 is moved out of a tuck space 112 defined between the forward door 14 and a frame 24 of the vehicle 12, such that the rearward door 16 is free to rotate between the open and closed positions 50, 52 without colliding with the forward door 14. Once the rearward door 16 is in the staging position 48, the rearward door 16 can then move from the closed position 52 to the open position 50 (step 406). As discussed above, this motion of the rearward door 16 about the second hinge 42 from the closed position 52 to the open position 50 can be caused by another pull of the handle 138 or can be caused by an automatic unlatching of the latch 58 from the striker path 60, once the rearward door 16 is in the staging position 48. To move the rearward door 16 from the closed to the open position 50, a motor 120 can automatically rotate the rearward door 16 or the rearward door 16 can be manually operated from the closed to open position 50. When the user of the vehicle 12 is ready to close the rearward door 16, the rearward door 16 is moved from the open position 50 to the closed position 52 to redefine the staging position 48 of the rearward door 16 (step 408). Once re-latched in the secured position 46, the rearward door 16 is then automatically moved from the staging position 48 back to the secured position 46 (step 410).

According to the various embodiments, the use of the tuck space 112 provides a securing feature that may be advantageous during a collision involving the vehicle 12. The positioning of the latch side 74 of the rearward door 16 within the tuck space 112 between the frame 24 and the forward door 14 substantially secures the rearward door 16 in the closed position 52 during such a collision. The forward door 14 prevents the movement of the latch side 74 of the rearward door 16 in the outward direction 56. In this manner, the rearward door 16 remains in the closed position 52 or substantially in the closed position 52 during such a collision or other similar impact involving the vehicle 12.

It is also contemplated that the movement of the rearward door 26 between the secured and staging positions 46, 48 allows for engagement and disengagement, respectively, of a door seal system. The door seal system is adapted to form a tight seal between the forward and rearward doors 14, 16 and between the rearward door 16 and the access aperture 22 as the rearward door 16 moves into the secured position 46. Because the latch side 74 of the rearward door 16 is positioned behind and substantially against the forward door 14 when in the secured position 46, the door seal system can be positioned in a variety of areas within the tuck space 112.

It is contemplated that the latch sliding mechanism 10 can be used in conjunction with various proximity signals that can be incorporated within a key fob, portable computing devices (smart phones, tablets, wearable technology) such that the locking and unlocking operation of the latch sliding mechanism 10 can be accomplished remotely. Additionally, the use of a portable computing device can serve to manipulate the rearward door 16 from the secured to the staging position 48, or vice versa, as the occupant of the vehicle 12 approaches or walks away from the vehicle 12.

It is contemplated that the rearward door 16 can include a door handle 138 on the inside of the vehicle 12 for allowing an occupant to operate the rearward door 16 between the secured and staging positions 46, 48 and the open and closed positions 50, 52. The interior door handle 138 can also be located toward a front area of the rearward door 16 near the meeting point of the forward and rearward doors 14, 16. It is also contemplated that the rearward door 16 can include an exterior handle 170 positioned along a forward edge 172 of the rearward door 16 that becomes accessible once the rearward door 16 is moved from the secured position 46 to the staging position 48. When the rearward door 16 is in the secured position 46, the forward edge 172 of the rearward door 16 is tucked within the tuck space 112 between the forward door 14 and the frame 24 of the vehicle 12. When the rearward door 16 moves to the staging position 48, the space between the rearward door 16 and the forward door 14 defines an accessible space 174 within which the user of the vehicle 12 can access an external handle 32 to operate the rearward door 16 from the closed position 52 to the open position 50 when the rearward door 16 is in the staging position 48. It is also contemplated that the exterior handle 170 can be located on the outer surface of the rearward door 16 and usable when both the forward and rearward doors 14, 16 are each in the closed positions 52.

According to the various embodiments, it is contemplated that when a user of a vehicle 12 approaches the vehicle 12 having the latch sliding mechanism 10 to enter the vehicle 12, proximity of the key fob and/or the appropriate portable computing device can automatically cause the rearward door 16 to operate from the secured to the staging positions 46, 48 to allow convenient access for the user to open the rearward door 16 from the closed position 52 to the open position 50. It is contemplated that once the occupant of the vehicle 12 places the vehicle 12 in a gear other than "park" or provides some other similar signal that operational of the vehicle 12 is imminent, the rearward door 16 can then be moved from the staging position 48 to the secured position 46. So long as the door is in the staging position 48, it is contemplated that the latch 58 can remain secured with the striker path 60 where manipulation of a handle 32 of the rearward door 16 is required to move the rearward door 16 from the closed position 52 to the open position 50 when the rearward door 16 is in the staging position 48.

According to the various embodiments, the latch sliding mechanism 10 can be used in various doors that can include, but are not limited to, extended cab rearward doors 16, sliding doors, front hinged doors, tailgates, trunks, hoods, and other operable exterior panels within a vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
    a passenger cabin having an access aperture with oppositely hinged forward and rearward doors coupled to a vehicle frame;
    a rearward hinge assembly having a first hinge extending between the vehicle frame and the rearward door and a second hinge positioned at an end of the first hinge proximate the rearward door, wherein operation of the first hinge slides the rearward door between a secured position and a staging position, the secured position defined by a portion of the rearward door being positioned within the access aperture and between the vehicle frame and the forward door, the staging position defined by the rearward door translating in a rearward and outward direction away from the access aperture and the forward door, and wherein operation of the second hinge rotates the rearward door between open and closed positions when the rearward door is in the staging position; and
    a latch of the rearward door that translates along a longitudinally elongated striker member during operation of the first hinge, wherein the latch remains selectively secured with the longitudinally-elongated striker member during operation of the rearward door from the secured and staging positions, wherein the latch is selectively engaged and disengaged from the longitudinally elongated striker member when the rearward door is in the staging position.

2. The vehicle of claim 1, wherein the rearward door rotates about an engagement area defined by selective engagement of the latch and the longitudinally elongated striker member during operation of the rearward door between the secured and staging positions.

3. The vehicle of claim 1, wherein the longitudinally elongated striker member is defined by an elongated striker coupled to the vehicle frame, wherein the latch slides along the elongated striker during operation of the rearward door between the secured and staging positions.

4. The vehicle of claim 2, wherein the longitudinally elongated striker member is defined by a fixed bar that is coupled to the vehicle frame.

5. The vehicle of claim 1, wherein the latch is selectively engaged and disengaged from the longitudinally elongated striker member only when the rearward door is in the staging position.

6. The vehicle of claim 1, further comprising:
    a release mechanism coupled to the rearward hinge assembly and the latch, wherein the release mechanism is operable to define a first manipulation that operates the rearward door from the secured position to the staging position, and wherein the release mechanism is operable to subsequently define a second manipulation that disengages the latch from the longitudinally elongated striker member when the rearward door is in the staging position.

7. The vehicle of claim 1, further comprising:
    a motor coupled to at least one of the rearward hinge assembly and the longitudinally elongated striker member, wherein the motor operates the rearward door between the secured and staging positions.

8. The vehicle of claim 1, wherein the first hinge is a gooseneck hinge.

* * * * *